US012675159B2

(12) United States Patent
Najer et al.

(10) Patent No.: US 12,675,159 B2
(45) Date of Patent: Jul. 7, 2026

(54) EYE TRACKER COMPRISING A SHADOW MASK AND ELECTRONIC DEVICE

(71) Applicant: ams International AG, Jona (CH)

(72) Inventors: Daniel Najer, Rotkreuz (CH); Ferran Suarez, Rüschlikon (CH); Francesco Paolo D'Aleo, Samstagern (CH)

(73) Assignee: AMS INTERNATIONAL AG, Jona (CH)

( * ) Notice: Subject to any disclaimer, the term of this patent is extended or adjusted under 35 U.S.C. 154(b) by 0 days.

(21) Appl. No.: 19/130,957

(22) PCT Filed: Dec. 1, 2023

(86) PCT No.: PCT/EP2023/083901
§ 371 (c)(1),
(2) Date: May 19, 2025

(87) PCT Pub. No.: WO2024/115723
PCT Pub. Date: Jun. 6, 2024

(65) Prior Publication Data
US 2026/0186564 A1 Jul. 2, 2026

(30) Foreign Application Priority Data
Dec. 1, 2022 (DE) ..................... 10 2022 131 831.1

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/0172* (2013.01); *G06V 40/19* (2022.01); *G02B 2027/0178* (2013.01)

(58) Field of Classification Search
CPC ...... G06F 3/013; G06V 40/19; G02B 27/0093
See application file for complete search history.

(56) References Cited

U.S. PATENT DOCUMENTS 6,464,692 B1* 10/2002 Ruiz ................... G03F 7/70291
606/4
2014/0043320 A1 2/2014 Tosaya et al.
(Continued)

OTHER PUBLICATIONS

You, E. et al., "EyeCoD: Eye Tracking System Acceleration via FlatCam-based Algorithm & Accelerator Co-Design", ISCA '22: Proceedings of the 49th Annual International Symposium on Computer Architecture, dated Jun. 18, 2022, 46 pages, IEEE, New York, USA.
(Continued)

*Primary Examiner* — Robert J Michaud
(74) *Attorney, Agent, or Firm* — VIERING, JENTSCHURA & PARTNER mbB

(57) ABSTRACT

An eye tracker comprises a shadow mask, a light emitting element, and a detection region at a first side of the shadow mask. The light emitting element emits electromagnetic radiation towards an eye arranged at a second side of the shadow mask, which comprises portions that are transparent for the electromagnetic radiation and portions that are opaque for the electromagnetic radiation, the transparent portions having a maximum width measured in a first horizontal direction. The detection region comprises a pixel array and is configured to receive electromagnetic radiation emitted by the light emitting element, reflected by a cornea of the eye, and transmitted by the shadow mask. A maximum distance $P_S$ between adjacent pixels and the maximum width $w_A$ of the transparent portions satisfy the following formula:

$$0.9 * w_A \leq P_S \leq 1.25 * w_A,$$

the maximum distance between adjacent pixels being measured in the first horizontal direction.

14 Claims, 7 Drawing Sheets

(51) Int. Cl.
    G02B 27/01         (2006.01)
    G06V 40/19         (2022.01)

(56)               References Cited

U.S. PATENT DOCUMENTS

2019/0237021 A1 *   8/2019   Peng ...................... G09G 5/003
2022/0350150 A1     11/2022   Ikeda et al.

OTHER PUBLICATIONS

Asif, M. Salman et al., "FlatCam: Thin, Bare-Sensor Cameras using Coded Aperture and Computation", dated Aug. 31, 2015, pp. 1-12, retrieved from https://arxiv.org/abs/1509.00116.
International Search Report for PCT/EP2023/083901, dated Jan. 31, 2024, 3 pages (for reference purpose only).
German Search Report for 10 2022 131 831.1, dated Jul. 5, 2023, 5 pages (for reference purpose only).

* cited by examiner

EYE TRACKER COMPRISING A SHADOW MASK AND ELECTRONIC DEVICE

CROSS-REFERENCE TO RELATED APPLICATIONS

This is a US national phase of international patent application PCT/EP2023/083901, filed on Dec. 1, 2023, which claims priority to German patent application 10 2022 131 831.1, filed on Dec. 1, 2022, the entire content of each of which is hereby incorporated by reference.

TECHNICAL FIELD

The present disclosure relates to an eye tracker comprising a shadow mask.

BACKGROUND

Many applications use eye tracking for foveated rendering or for providing user interfaces based on an eye gaze direction.

Attempts are being made to develop improved eye trackers.

It is an object of the present invention to provide an improved eye tracker.

SUMMARY

According to embodiments, the above object is achieved by the claimed matter according to the independent claims. Further developments are defined in the dependent claims.

According to embodiments, an eye tracker comprises a shadow mask, a light emitting element, and a detection region arranged at a first side of the shadow mask. The light emitting element is configured to emit electromagnetic radiation towards an eye arranged at a second side of the shadow mask. The shadow mask comprises transparent portions being transparent for the electromagnetic radiation and opaque portions being opaque for the electromagnetic radiation. The transparent portions have a maximum width measured in a first horizontal direction. The detection region is configured to receive electromagnetic radiation emitted by the light emitting element, reflected by a cornea of the eye and transmitted by the shadow mask. The detection region comprises a pixel array comprising a plurality of pixels. A maximum distance $P_S$ between adjacent pixels and the maximum width $w_A$ of the transparent portions satisfy the following formula:

$$0.9*w_A \leq P_S \leq 1.25*w_A,$$

the maximum distance between adjacent pixels being measured in the first horizontal direction.

For example, the maximum width $w_A$ may be approximately identical with the maximum distance $P_S$. According to further implementations, the maximum distance $P_S$ between adjacent pixels and the maximum width $w_A$ of the transparent portions may satisfy the following formula:

$$0.944*w_A \leq P_S.$$

Further, the following formula may be fulfilled:

$$P_S \leq 1.2*w_A.$$

For example, the distance between adjacent pixels may be smaller than a projected minimum lateral displacement of electromagnetic radiation reflected by the cornea due to an eye movement. In more detail, the distance between adjacent pixels may be less than 100 μm.

According to embodiments, an optical distance between the detection region and the shadow mask may be less than 10 mm.

For example, the detection region and the light emitting element may be arranged on a common carrier.

The eye tracker may comprise a plurality of light emitting elements. The light emitting elements may be arranged in a region outside the pixel array.

According to implementations, the opaque portions of the shadow mask may be transparent for visible light.

The eye tracker may further comprise a processing unit which is configured to determine an eye movement from signals received by the detection portion.

For example, the processing unit may be further configured to perform user authentication based on the signals received by the detection portion. In particular, the processing unit may be configured to identify periocular features.

According to embodiments, the shadow mask may be arranged at a first main surface of a lens and the detection region is arranged at a second main surface of a lens.

According to further embodiments, the shadow mask and the detection region may be arranged at a first main surface of a lens. The eye tracker may further comprise a buffer material between the shadow mask and the detection region.

According to embodiments, an electronic device comprises the eye tracker as described above.

For example, the electronic device may further comprise a display element that emits visible light. The eye tracker may be arranged on a light emission side of the display element between the display element and the eye.

For example, the electronic device may be selected from smartglasses and a head-mounted display.

BRIEF DESCRIPTION OF THE DRAWINGS

The accompanying drawings are included to provide a further understanding of embodiments the invention and are of incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

DETAILED DESCRIPTION

In the following detailed description reference is made to the accompanying drawings, which form a part hereof and in which are illustrated by way of illustration specific embodiments in which the invention may be practiced. In this regard, directional terminology such as "top", "bottom", "front", "back", "over", "on", "above", "leading", "trailing" etc. is used with reference to the orientation of the Figures being described. Since components of embodiments of the invention can be positioned in a number of different orientations, the directional terminology is used for purposes of illustration and is in no way limiting. It is to be understood that other embodiments may be utilized and structural or logical changes may be made without departing from the scope defined by the claims.

The description of the embodiments is not limiting. In particular, elements of the embodiments described hereinafter may be combined with elements of different embodiments.

The terms "lateral" and "horizontal" as used in this specification intends to describe an orientation parallel to a first surface of a substrate or semiconductor body. This can be for instance the surface of a wafer or a die. According to embodiments, the terms "lateral" or "horizontal" may specifically refer to a plane or a surface of a shadow mask. Further, these terms may refer to a plane of a detection region.

The term "vertical" as used in this specification intends to describe an orientation which is arranged perpendicular to the first surface of a substrate or semiconductor body.

Figure 1:
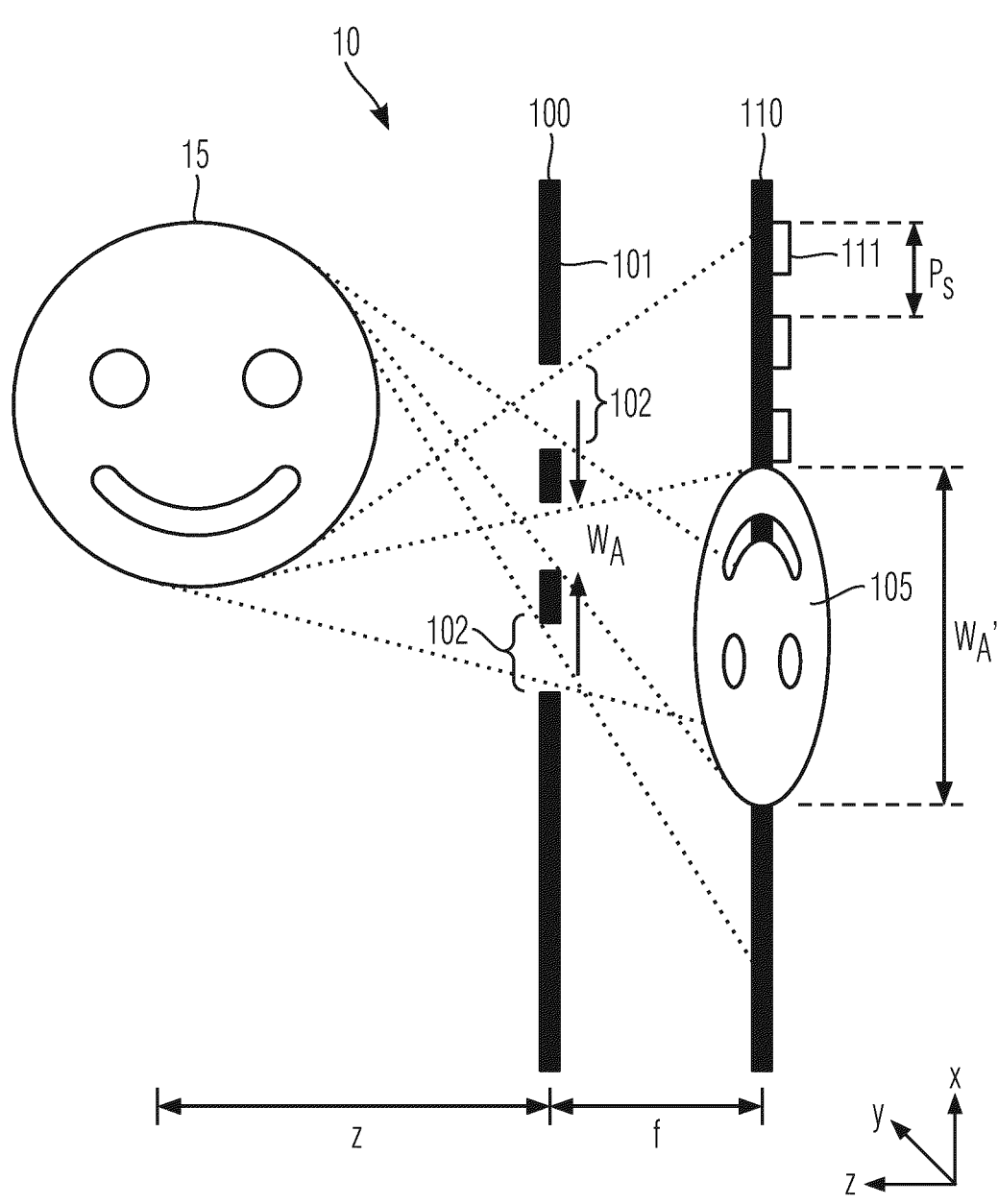
FIG. 1 shows a schematic drawing of an optical sensor element using a shadow mask.

FIG. 1 shows a schematic setup illustrating concepts of an optical sensor 10 that may implement or be a component of an eye tracker 11 according to embodiments. The optical sensor 10 comprises a shadow mask 100, a light emitting element (not illustrated in FIG. 1) and a detection region 110 arranged at a first side of the shadow mask 100. The light emitting element is configured to emit electromagnetic radiation towards an object 15 that is arranged at a second side of the shadow mask 100. The shadow mask 100 comprises transparent portions 102 being transparent for the electromagnetic radiation emitted by the light emitting element and opaque portions 101 being opaque for the electromagnetic radiation. The transparent portions have a width $w_A$ measured in a first horizontal direction, e.g. the x-direction. The detection region 110 comprises a pixel array comprising a plurality of pixels 111 which are arranged at a maximum distance between adjacent pixels $P_S$. The detection region 110 is configured to receive electromagnetic radiation emitted by the light emitting element, reflected by the object 15 and transmitted by the shadow mask 100. A maximum distance $P_S$ between adjacent pixels and the maximum width $w_A$ of the transparent portions satisfy the following formula:

$$0.9 * w_A \le P_S \le 1.25 * w_A.$$

The maximum distance between adjacent pixels is measured in the first horizontal direction.

For example, the maximum width $w_A$ may be approximately identical with the maximum distance $P_S$. According to further implementations, the maximum distance $P_S$ between adjacent pixels and the maximum width $w_A$ of the transparent portions may satisfy the following formula:

$$0.944 * w_A \le P_S.$$

Further, the following formula may be fulfilled:

$$P_S \le 1.2 * W_A.$$

Due to these relationships, under sampling is reduced. If the maximum width $w_A$ of the transparent portions is larger than indicated above, there is a low-pass filtering effect on the reconstructed image. If the maximum width $w_A$ of the transparent portions is smaller than indicated above further artifacts on the reconstruction are induced.

As is further illustrated in FIG. 1, the detection region 110 is arranged at a distance f to the shadow mask 100. The detection region 110 may be arranged in a plane which is parallel to the plane of the shadow mask 100. Further, the shadow mask 100 is arranged at a distance z to the object 15.

The imaging process illustrated in FIG. 1 corresponds to the imaging process of the camera obscura which is a lensless imaging process. By providing a large number of transparent portions 102 of the shadow mask, a large amount of illumination may be transmitted by the shadow mask. Using the known pattern of the transparent portions 102, it is possible to perform object reconstruction without imaging optics e.g. lenses. This imaging method is also referred to as "coded aperture imaging". Optical sensors using coded aperture imaging are less bulky and have a lower weight than conventional imaging devices. Further, these optical sensors may be manufactured at lower cost.

FIG. 1 further shows an object image 105 which is obtainable by imaging the object 15 by a central transparent portion 102 of the shadow mask. Further object images (not illustrated in FIG. 1) are obtained by imaging the object 15 by the further transparent portions 102 of the shadow mask 100.

The minimum feature size corresponds to the aperture diameter $w_A$.

Due to the use of coded aperture imaging, a low size, weight and cost of the device may be achieved. Further, using CMOS-based image sensors, the optical sensor may be highly scaled. The described optical sensor provides visual privacy since the sensor data are visually unrecognizable. The optical sensor 10 may further enable compressive imaging, i.e. imaging beyond 2D information.

Figure 2A:
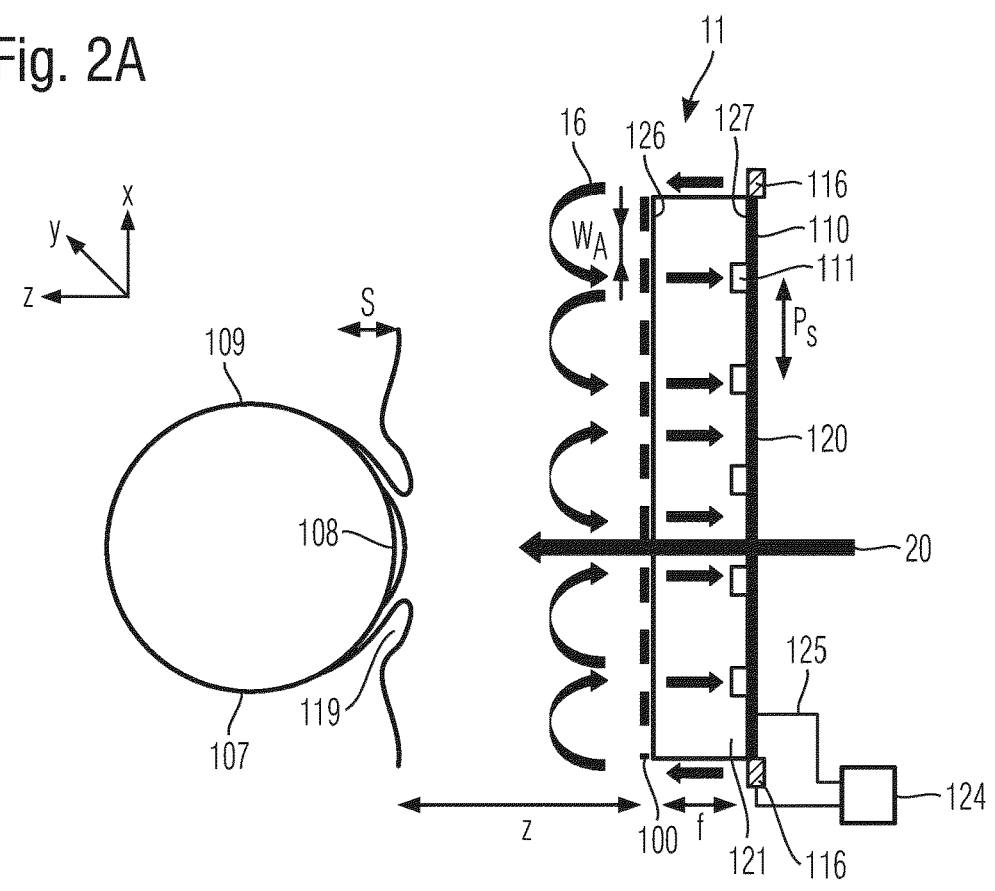
FIG. 2A shows a schematic cross-sectional view of an eye tracker according to embodiments.

FIG. 2A shows an eye tracker 11 according to embodiments. The eye tracker 11 comprises a shadow mask 100, a light emitting element 116 and a detection region 110 which is arranged at a first side of the shadow mask 100. The light emitting element 116 is configured to emit electromagnetic radiation towards an eye 107 which is arranged at a second side of the shadow mask 100. The shadow mask comprises transparent portions 102 and opaque portions 101. The transparent portions 102 are transparent for the electromagnetic radiation 16. The opaque portions 101 are opaque for the electromagnetic radiation 16. The transparent portions 102 have a maximum width $w_A$ which is measured in a first horizontal direction, e.g. the x-direction. The detection region 110 is configured to receive electromagnetic radiation 16 emitted by the light emitting element 116, reflected by a cornea 108 of the eye and transmitted by the shadow mask 100. The detection region 110 comprises an array of pixels 111. The pixels 111 are arranged at a maximum pixel distance $P_S$. The maximum distance $P_S$ between adjacent pixels and the maximum width $w_A$ of the transparent portions satisfy the following formula:

$$0.9 * w_A \le P_S \le 1.25 * w_A,$$

the maximum distance between adjacent pixels being measured in the first horizontal direction.

FIG. 2A further shows an eye 107 having a cornea 108 which is arranged on a side of the eye tracker 11. FIG. 2A further illustrates an eyeball 109 and a lid 119. A distance from the cornea 108 to the eye tracker 11 is denoted by z. For example, z may be in a range of 10 to 20 mm, e.g. 10 to 15 mm, for example 13 mm.

The light emitting elements 116 may comprise light emitting diodes (LED) or VCSELs ("vertical cavity surface emitting laser"). For example, the light emitting elements 116 may be configured to emit electromagnetic radiation in the infrared range, e.g. at a wavelength larger than 700 nm. Accordingly, the opaque portions 101 of the shadow mask may be opaque for infrared light, e.g. having a wavelength larger than 700 nm, and may be transparent for visible light. The shadow mask 100 may e.g. be formed over a transparent carrier, e.g. a lens 121 of glasses. As is shown in FIG. 2A, the shadow mask 100 may be arranged at a first main surface 126 of the lens 121. Moreover, the detection region 110 is arranged at a second main surface 127 of the lens 121. The distance f may correspond to a thickness of the lens 121.

The eye tracker 11 may further comprise a processing unit 124 which may be connected to the detection region 110 by wirings 125. Further, the processing unit 124 may be electrically connected to the light emitting element 116 by means of the wiring 125. For example, the processing unit 124 may be configured to determine a gaze direction and an eye movement from signals received by the detection region. Further, as will be explained below, the processing unit 124 may identify periocular features of a user. As is shown in FIG. 2A, the eye tracker 11 is arranged direct in front of the eye and the cornea 108.

Figure 2B:
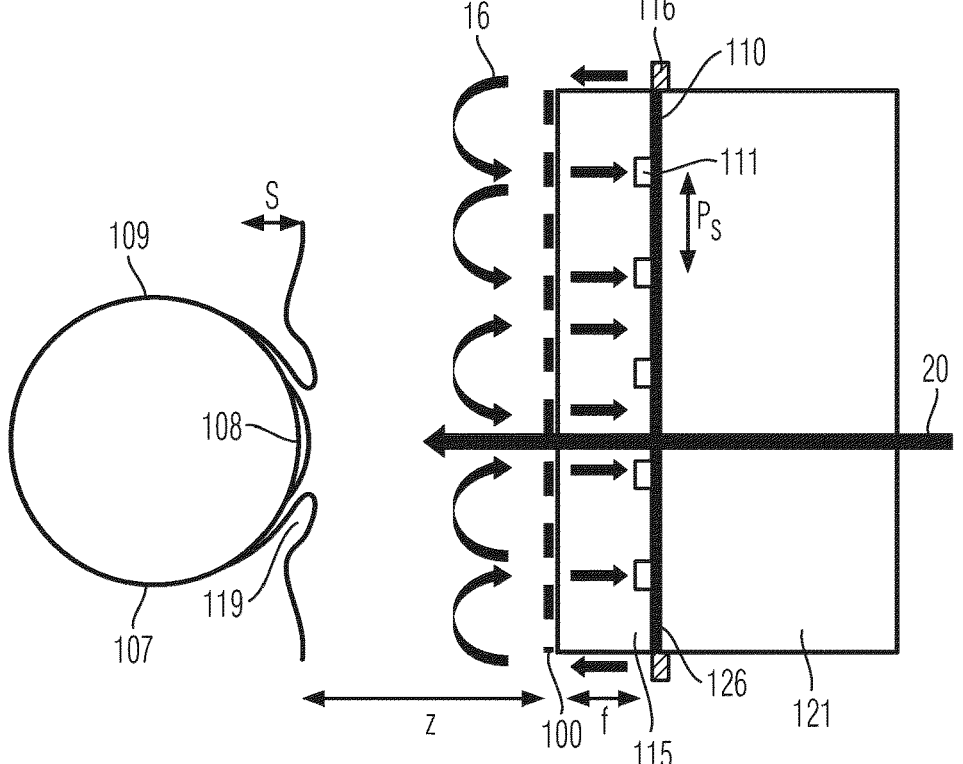
FIG. 2B shows a cross-sectional view of an eye tracker according to further embodiments.

FIG. 2B shows a schematic cross-sectional view of the eye tracker 11 according to further embodiments. FIG. 2B shows essentially the same components as FIG. 2A. Differing from FIG. 2A, according to FIG. 2B, the detection region 110 and the shadow mask 100 may be arranged at a first main surface 126 of the lens 121 of the glasses. A transparent buffer material 115 may be arranged between the detection region 110 and the shadow mask 100. According these embodiments, the distance f may be different from a thickness of the lens.

Figure 2C:
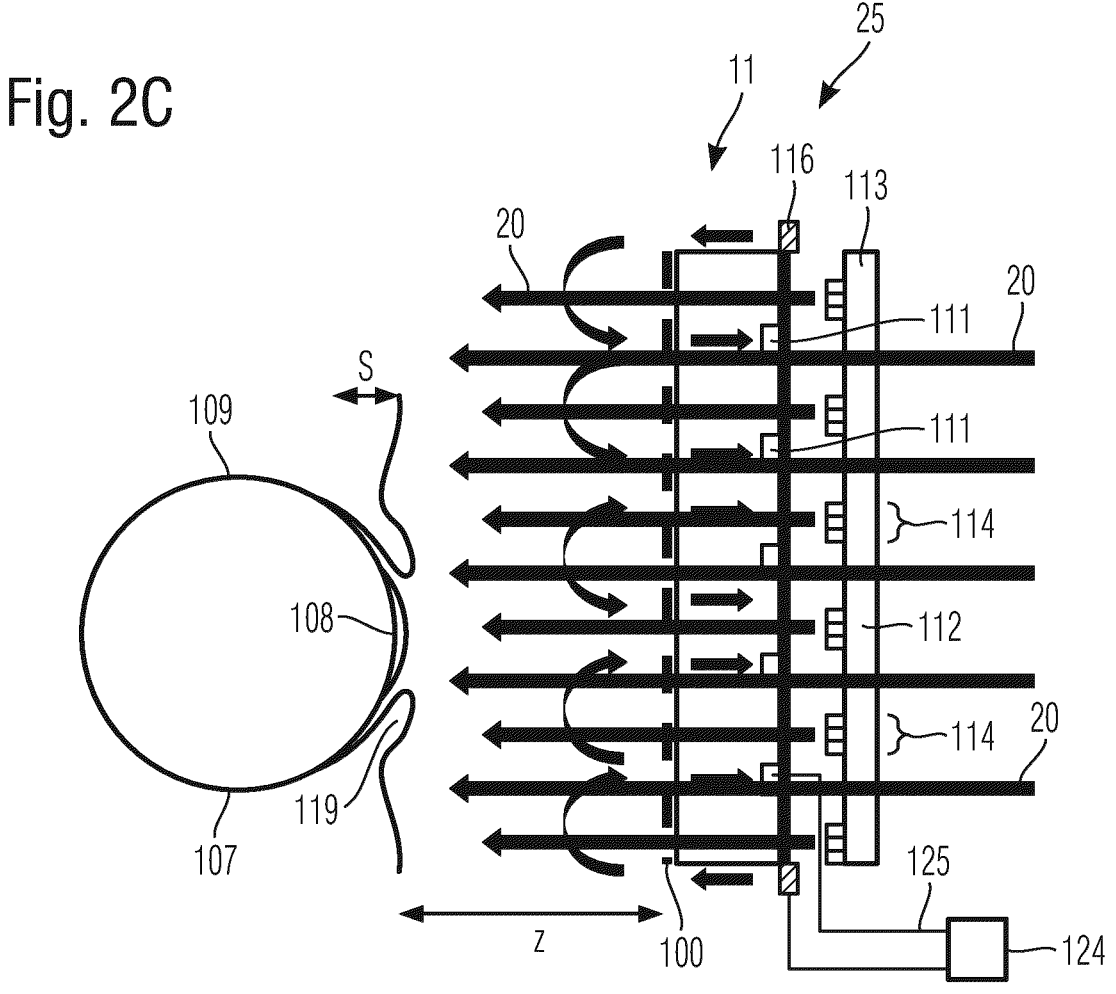
FIG. 2C shows a cross-sectional views of an electronic device according to embodiments.

FIG. 2C shows a schematic cross-sectional view of an electronic device 25 comprising the eye tracker 11 illustrated in FIG. 2A. Components of the eye tracker 11 illustrated in FIG. 2C are similar or identical with components of the eye tracker illustrated with reference to FIGS. 2A and 2B. In addition, the electronic device 25 further comprises a display element 113. For example, the display element 113 comprises LEDs for emitting visible light 20. The display element 113 may be configured to display additional information. For example, the light emitting devices of the display element 113 may block visible light 20. The display element 113 may comprise a transparent substrate 112 which is transparent for visible light 20.

For example, a user of the electronic device 25 may see additional information or content which is displayed by means of the display element 113. According to further implementations, the display element 113 may comprise an opaque display substrate 112. For example, in this case, content may be displayed on the display element 113 while an eye movement and a gaze direction 118 are tracked by means of the eye tracker 11.

For example, the electronic device 25 shown in FIG. 2C may be employed for e.g. VR ("virtual reality") or AR ("augmented reality") applications.

Figure 2D:
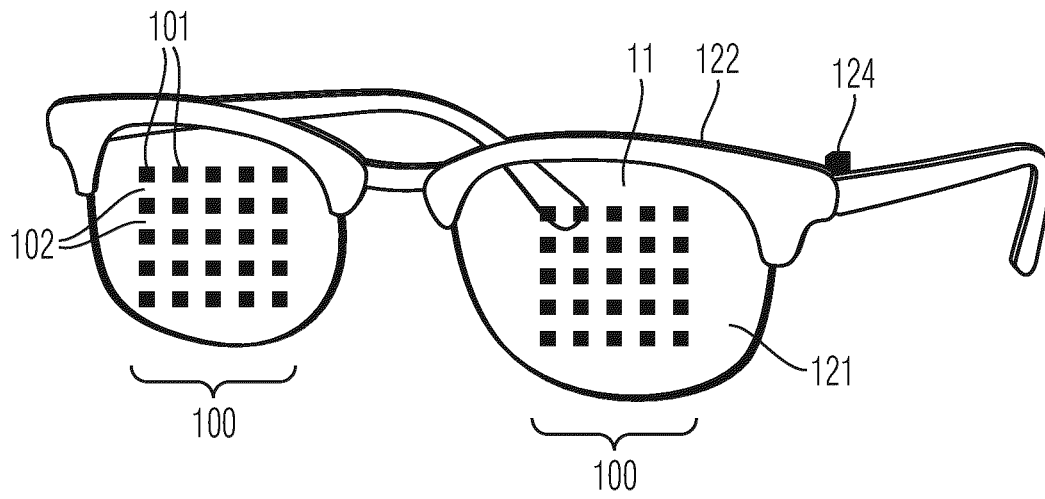
FIG. 2D shows a perspective view of smart glasses comprising the eye tracker according to embodiments.

FIG. 2D shows glasses, e.g. smart glasses 122 implementing an electronic device 25 including the eye tracker 11 which has been explained above. For example, the shadow mask 100 may be printed on a surface of the lens 121 of the glasses 122 shown in FIG. 2D. A processing unit 124 which is configured to process signals received by the detection region may be arranged e.g. in the temple of the glasses 122.

FIG. 2D further shows an arrangement pattern of opaque and transparent portions 101, 102. As is illustrated the opaque portions 101 may be arranged in rows and columns. However, different arrangement patterns are possible. For example, the opaque portions 101 may be arranged in a so-called MURA ("modified uniformly redundant area") or in a circular or spiral pattern. Further, the shape of the opaque portions 101 may be arbitrary. For example, the opaque portions 101 may have a rectangular, circular, or oval shape.

Figure 2E:
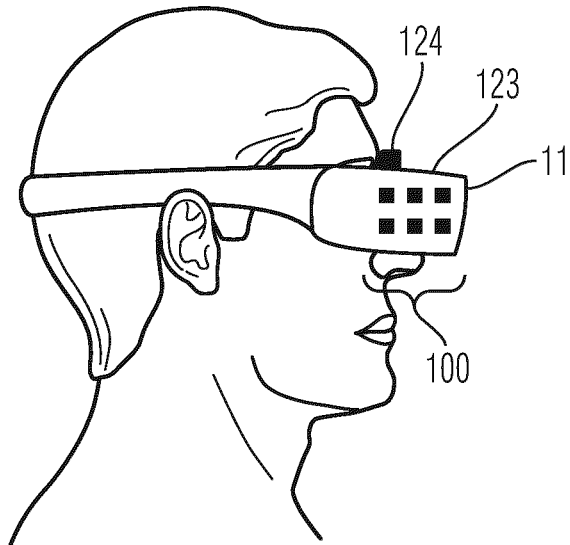
FIG. 2E schematically shows a head-mounted display comprising the eye tracker according to embodiments.

FIG. 2E shows an example of a head-mounted display 123 which may comprise the eye tracker 11 as has been explained above. The processing unit 124 may further be arranged in the head-mounted display.

For example, the smart glasses 122 and the head-mounted display 123 may, for example, further comprise the display element 113 which has been explained above.

Figure 3A:
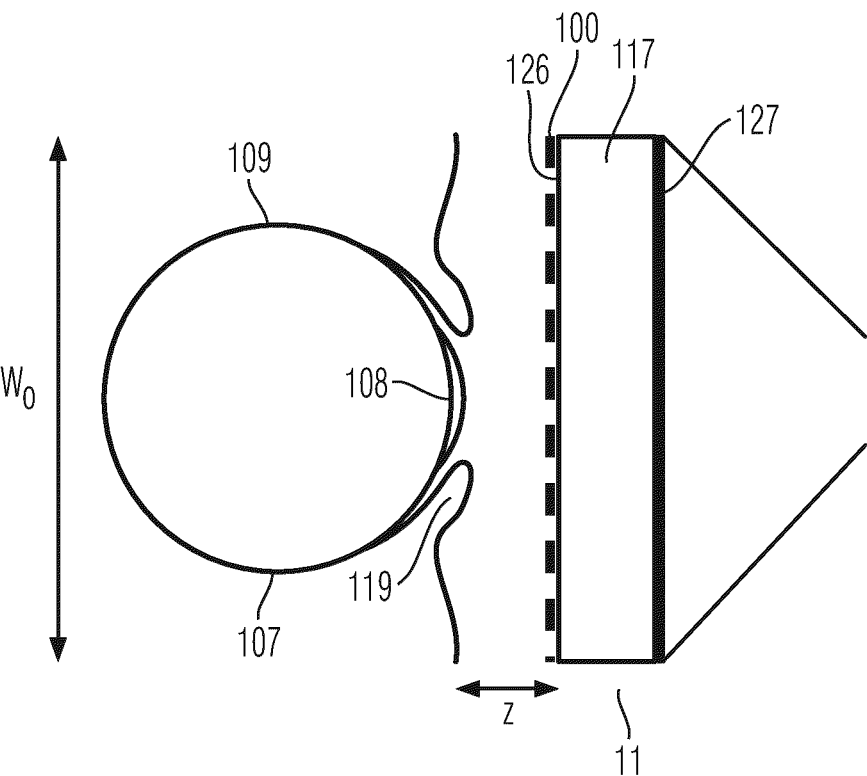
FIG. 3A illustrates further elements of an eye tracker according to embodiments.

FIG. 3A shows an example of dimensions of the eye tracker 11 and an eye 107. A size of the shadow mask 100 may be in a range of 1 to 3 cm, e.g. 2 cm. The shadow mask 100 is mounted to a first main surface 126 of a glass substrate 117. The distance between the shadow mask 100 and the cornea 108 of the eye 107 may be z, e.g. in a range of less than 3 cm.

Figure 3B:
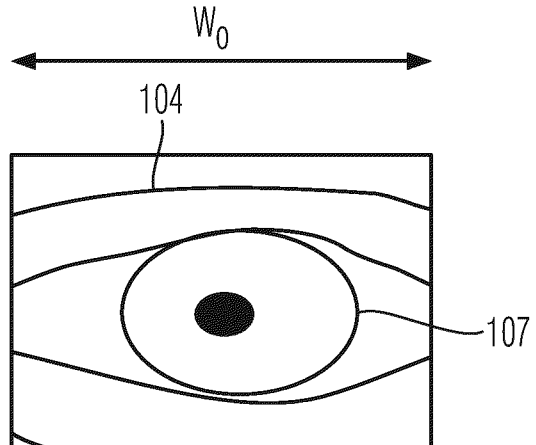
FIG. 3B visualizes elements for performing eye tracking.

FIG. 3B shows by way of example periocular features 104 which may be identified using the eye tracker 11 that has been explained above. For example, the periocular features 104 may comprise eye folds, e.g. the upper eye fold and the lower eye fold. Moreover, the periocular features 104 may comprise a contour of the eyelid 119. For example, a width of the region of the eye which is analyzed may be $W_0$. For example, the processing unit 124 which may be a component of the eye tracker 11 may be configured to detect and identify periocular features 104 of a user from signals detected by the detection region 110. Further, the processing unit 124 may perform user authentication using the identified periocular features 104.

Figure 3C:
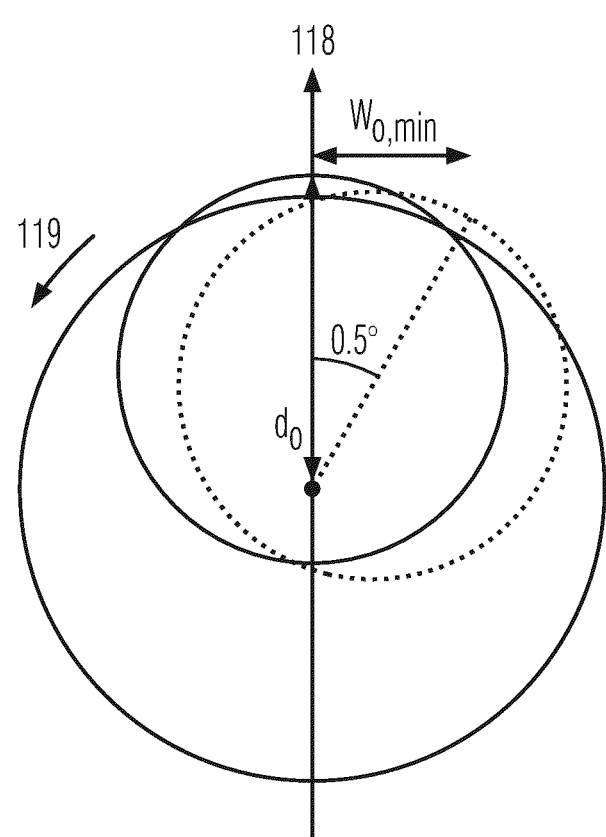
FIG. 3C illustrates the dependence of a minimum lateral displacement in dependence from a minimum angle.

FIG. 3C shows an estimation of a minimum of a lateral displacement $W_{0, min}$ in dependence from a minimum angle of an eye movement. As can be taken from FIG. 3C, when the eye is moved in a movement direction 119, e.g. by 0.5°, a corresponding horizontal distance may be 112 μm. Accordingly, in order to detect an eye movement in a range of 0.5°, a lateral displacement of a light beam reflected by the center of the cornea 108 of approximately 112 μm should be resolved. FIG. 3C further illustrates an eye gaze direction 118.

Figure 4A:
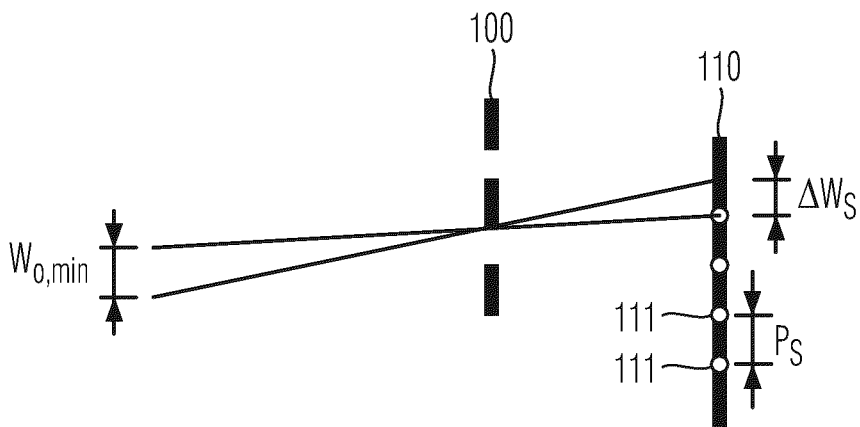
FIGS. 4A and 4B are schematic views illustrating further dimensions of an eye tracker according to embodiments.

FIG. 4A illustrates a relationship between the imaged distance $W_{0, min}$ which is imaged by the shadow mask 100 onto the detection region 110. As can be taken from FIG. 4A, in order to resolve the minimum of the lateral displacement $W_{0, min}$ a maximum distance between adjacent pixels $P_{S, max}$ fulfills the following formula:

$$P_{s,max} = W_{0,min} * f/z$$

7

Accordingly, the distance $P_S$ between adjacent pixels is smaller than the difference in projection size from two minimally separated points with a lateral distance $W_{0,min}$.

Figure 4B:
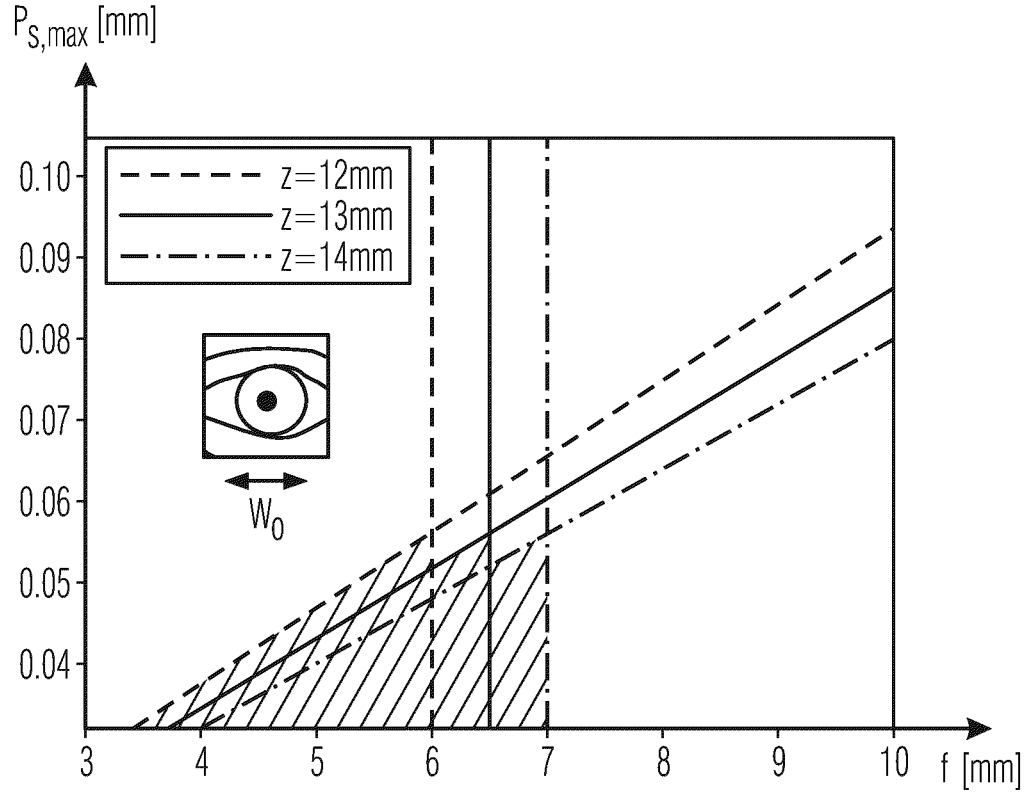

FIG. 4B further shows allowed parameter ranges, in particular for the mask-to-sensor optical distance f. The term "optical distance" refers to the product of the physical or measured distance s (e.g. thickness of the respective medium, e.g. the substrate 117 or the buffer material 115) multiplied by the refractive index of the respective medium, e.g. the material of the substrate 117 or the buffer material 115. The mask-to-sensor optical distance f depends on the distance z between the shadow mask 100 and the cornea 108 as is e.g. illustrated in FIG. 3A. In order to provide that the projection width of the object or eye 107 onto the detection region 110 is smaller than the sensor size $W_S$, the optical distance f should be on the left side of the respective vertical lines indicating different optical distances z between the eye 107 and the shadow mask 100. Further, in order to allow for the minimum lateral displacement to be detected, the maximum distance between pixels $P_s$ should be below the diagonal lines. In summary, in order to fulfill both requirements, the maximum distance between pixels $P_s$ should lie within the hatched portions illustrated in FIG. 4B.

In more detail, the maximum optical distance $f_{max}$ between the shadow mask 100 and the detection region 110 may fulfill the following formula.

$$f_{max} = z \frac{W_S - W_A}{W_A + W_0}$$

Accordingly, for a sensor size of 4 cm and an object size $W_0$ (cf. FIG. 3B) of 20 mm, the values illustrated in FIG. 4B for f are possible for different distances z. In particular, FIG. 4B illustrates ranges for distances z. In the above calculations, the maximum distance $P_S$ between adjacent pixels is assumed to be identical with the maximum width $w_A$ of the transparent portions.

Depending on the size $W_s$ of the detection region 110 and the maximum distance $P_S$ between adjacent pixels 111 a transmittance T of the optical sensor for electromagnetic radiation emitted by the light emitting element(s) 116 may be determined.

$$T = 1 - (Ws/Ps)^2 - A_0$$

$A_0$ refers to an area of metal wirings for electrically connecting the pixels 111 or light emitting element(s) 116. For example, $A_0$ may be approximately 20 to 35%, e.g. 25 to 30%. For example, at a distance $P_s$ between adjacent pixels of approximately 105 μm, a transmittance of 70% may be achieved. Further, the eye tracker 11 may be fully transparent for visible light.

Based on the above formulas, further mask-to-sensor optical distances f may be determined for different object sizes $W_0$ and further intended image resolutions.

An electronic device comprising the eye tracker as described herein before may be used for various applications. In particular, the electronic device may be implemented as smart glasses or as a head-mounted display. The electronic device may be used in e.g. AR or VR applications. Due to the improved eye gaze detection, foveated rendering may be improved resulting in a drastic decrease of power consumption.

Due to the use of a shadow mask for performing eye tracking, an unobtrusive user authentication device is provided. There is no need for fingerprint sensors on the AR glasses that would require the user to lift his or her finger every time he or she would like to unlock his/her device. In particular, the eye tracker may fulfill both functionalities comprising the authentication process. The eye tracker may be placed on top of a transparent micro-display or on top of an opaque micro-display. A camera without bulky optics may accurately determine the eye gaze direction 118. By analyzing and identifying periocular features 104, additionally user authentication may be performed.

While embodiments of the invention have been described above, it is obvious that further embodiments may be implemented. For example, further embodiments may comprise any subcombination of features recited in the claims or any subcombination of elements described in the examples given above. Accordingly, this spirit and scope of the appended claims should not be limited to the description of the embodiments contained herein.

LIST OF REFERENCES 10 optical sensor
11 eye tracker
15 object
16 electromagnetic radiation
20 visible light
25 electronic device
100 shadow mask
101 opaque portion
102 transparent portion
104 periocular feature
105 object image
107 eye
108 cornea
109 eyeball
110 detection region
111 pixel
112 display substrate
113 display element
114 visible light emitting element
115 transparent buffer material
116 light emitting element
117 substrate
118 gaze direction
119 eyelid
120 carrier
121 lens
122 smart glasses
123 head-mounted display
124 processing unit
125 wiring
126 first main surface of lens
127 second main surface of lens

The invention claimed is:

1. An eye tracker comprising:
a shadow mask;
a light emitting element; and
a detection region arranged at a first side of the shadow mask;
the light emitting element being configured to emit electromagnetic radiation towards an eye arranged at a second side of the shadow mask, the shadow mask comprising transparent portions being transparent for the electromagnetic radiation and opaque portions being opaque for the electromagnetic radiation, the transparent portions having a maximum width measured in a first horizontal direction;

the detection region being configured to receive electromagnetic radiation emitted by the light emitting element, reflected by a cornea of the eye and transmitted by the shadow mask, the detection region comprising a pixel array comprising a plurality of pixels, wherein a maximum distance $P_S$ between adjacent pixels and the maximum width $w_A$ of the transparent portions satisfy the following formula:

$$0.9*w_A \leq P_S \leq 1.25*w_A,$$

the maximum distance between adjacent pixels being measured in the first horizontal direction.

2. The eye tracker according to claim 1, wherein the distance between adjacent pixels is smaller than a projected minimum lateral displacement of electromagnetic radiation reflected by the cornea due to an eye movement.

3. The eye tracker according to claim 2, wherein the distance between adjacent pixels is less than 100 μm.

4. The eye tracker according to claim 1, wherein an optical distance between the detection region and the shadow mask is less than 10 mm.

5. The eye tracker according to claim 1, wherein the detection region and the light emitting element are arranged on a common carrier.

6. The eye tracker according to claim 5, comprising a plurality of light emitting elements, the light emitting elements being arranged in a region outside the pixel array.

7. The eye tracker according to claim 1, wherein the opaque portions of the shadow mask are transparent for visible light.

8. The eye tracker according to claim 1, further comprising a processing unit configured to determine an eye movement from signals received by the detection portion.

9. The eye tracker according to claim 8, wherein the processing unit is further configured to perform user authentication based on the signals received by the detection portion, the processing unit being configured to identify periocular features.

10. The eye tracker according to claim 1, wherein the shadow mask is arranged at a first main surface of a lens and the detection region is arranged at a second main surface of a lens.

11. The eye tracker according to claim 1, wherein the shadow mask and the detection region are arranged at a first main surface of a lens, further comprising a buffer material between the shadow mask and the detection region.

12. An electronic device comprising the eye tracker according to claim 1.

13. The electronic device according to claim 12, further comprising a display element emitting visible light, the eye tracker being arranged on a light emission side of the display element between the display element and the eye.

14. The electronic device according to claim 12, being selected from smart glasses and a head-mounted display.

* * * * *